United States Patent [19]

Stearn et al.

[11] 4,236,859
[45] Dec. 2, 1980

[54] MOBILE HOIST

[75] Inventors: Richard A. Stearn; Gerald P. Lamer; Norbert W. Lenius, all of Sturgeon Bay, Wis.

[73] Assignee: Marine Travelift, Inc., Sturgeon Bay, Wis.

[21] Appl. No.: 908,277

[22] Filed: May 22, 1978

[51] Int. Cl.³ .............................................. B60P 3/10
[52] U.S. Cl. ..................... 414/460; 254/281; 254/324
[58] Field of Search ....................... 414/460, 461, 678; 254/135 CE, 144

[56] References Cited

U.S. PATENT DOCUMENTS

| Re. 25,276 | 10/1962 | Stearn ................................. 414/461 |
| 2,896,803 | 7/1959 | Clifton ................................ 414/461 |
| 3,531,088 | 9/1970 | Kraschnewski .......... 254/135 CE X |
| 3,721,358 | 3/1973 | Brock ................................... 414/460 |

Primary Examiner—Robert G. Sheridan
Attorney, Agent, or Firm—August E. Roehrig, Jr.

[57] ABSTRACT

A straddle-type mobile hoist having loading slings operatively connected to automatically equalize the loading applied through the slings and adapted to vary the lateral spacing between slings.

12 Claims, 13 Drawing Figures

FIG_7_

FIG_8_

FIG_9_

MOBILE HOIST

BACKGROUND OF THE INVENTION

This invention relates in general to mobile hoists and, in particular, to a straddle-type mobile hoist wherein the lifting load is automatically equalized to obtain optimum load distribution.

More specifically, but without restriction to the particular use which is shown and described, this invention relates to a straddle-type mobile hoist wherein the hoist loading is automatically equalized without requiring any load sensing device for controlling operation of the hoisting mechanism.

While this invention may be utilized with any straddle-type of mobile hoist, for convenience of illustration, the preferred embodiments will be described with reference to use with a sling-rigged boat hoist wherein the lifting load applied through the slings is automatically equalized to obtain optimum load distribution on the hull of a boat being lifted. Such sling-rigged boat hoists are used at harbor facilities to remove boats from the water and carry the boat on land to a storage or repair area. These boats are generally of a size such that they cannot be launched and removed from the water by vehicle drawn trailers or the launching facilities are such that they are not suitable for a launching ramp. These mobile hoists are generally mounted on wheels and provided with a source of power to move over land while carrying the boat in the hoist slings.

In operation, these mobile hoists are moved into a position straddling a slip formed between facing edges of two wharves, or piers, spaced a predetermined distance apart. Movable hoisting slings, which are supported by a structural framework, are lowered into the water and a boat is maneuvered over the slings. The slings are then raised to lift the boat out of the water so that the hoist can carry the boat across the land to its destination.

In the use of such mobile hoists, the loading applied to the boat hull from the lifting slings is frequently uneven, and uneven raising of the hoist slings can result in damage to the boat hull structure. One attempted solution to this problem of uneven loading and uneven raising of the hoist slings has been to use load sensing devices connected to the sling hoisting mechanism so that the lifting hoists operate in response to a differential in the loading applied to the slings. However, such devices add to the cost of the mobile hoist mechanism and are susceptible to malfunctions which cause improper operation of the lifting mechanism and compound the difficulties in attempting to alleviate the problems of uneven loading by the lifting slings.

SUMMARY OF THE INVENTION

It is, therefore, an object of this invention to improve mobile hoist mechanisms.

Another object of this invention is to operatively couple lifting slings of a sling-rigged mobile hoist to automatically equalize the sling loading.

A further object of this invention is to equalize the loading of a sling-rigged mobile hoist during loading and to equalize sling movement during operation in an unloaded condition.

Still another object of this invention is to selectively position the lateral spacing of the lifting sling rigging to obtain preselected load distributions.

These and other objects are attained in accordance with the present invention wherein there is disclosed two embodiments of a straddle-type mobile hoist having loading slings operatively connected to automatically equalize the loading applied through the slings and adapted to vary the lateral spacing between slings.

DESCRIPTION OF THE DRAWINGS

Further objects of the invention together with additional features contributing thereto and advantages accruing therefrom will be apparent from the following description of preferred embodiments of the invention which are shown in the accompanying drawings with like reference numerals indicating corresponding parts throughout, wherein.

DESCRIPTION OF THE PREFERRED EMBODIMENTS OF THE INVENTION

Referring to the embodiment of FIGS. 1-9 there is shown a sling-rigged, straddle-type mobile hoist having three slings 100, 200 and 300, sometimes referred to as the aft, mid and fore slings, respectively. Each of the slings comprise a pair of belts 20 connected to each end or side to a bar 30 supported from a vertically movable pulley system 40. The pulley systems 40 include a pair of sheaves 41 rotatably supported by parallelly spaced frame plates 42 suitably connected to the bar 30 and are each operatively connected through cables to a drum-type hoisting mechanism, including a winch and motor to raise and lower the slings. The hoisting mechanism is of any suitable type as known to those skilled in the art. The mobile hoist includes a structural framework that, except for the hoist mechanisms supported on one side, is substantially symmetrical about its longitudinal axis and which is supported by wheels 5 to move the frame on land. Therefore, for convenience of illustration, one side of hoist is described in detail and any differences will be specifically referred to with the same parts for either side being indicated by the same reference numerals.

Figure 1:
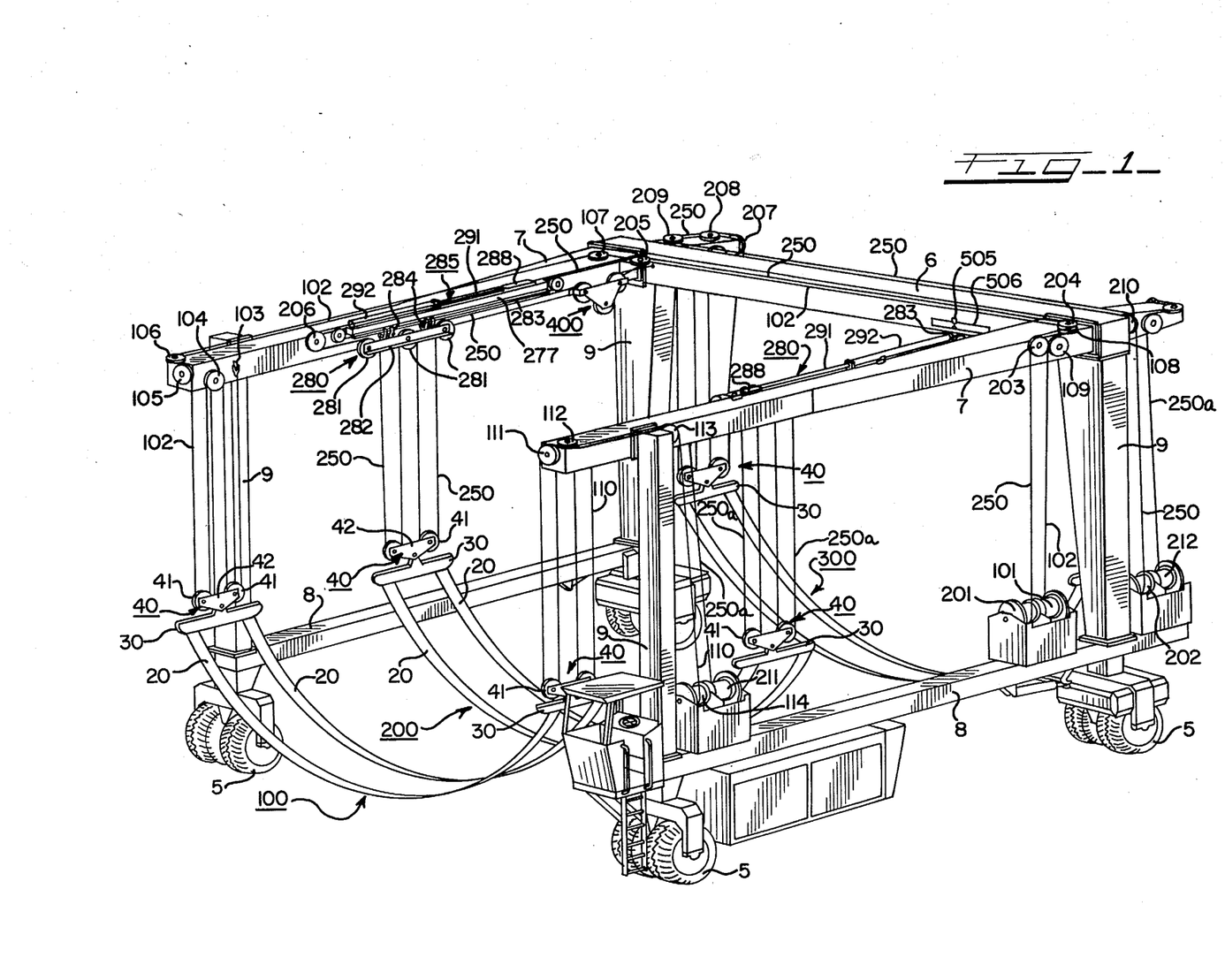
FIG. 1 is a frontal perspective view of a straddle-type mobile hoist illustrating the manner in which the lifting slings may be laterally spaced one from the other and the manner in which the slings are operatively connected to equalize loading.

Since the mobile hoist illustrated is especially suitable for use in lifting and moving boats, the rearward or aft end of the hoist is entirely open and the forward end is joined by a cross beam support 6 connecting upper support beams 7. The upper support beam 7 are each carried by a lower support beam 8 by support columns 9. Each of the slings 100, 200 and 300 is supported between the parallelly spaced upper support beams 7 and extend therebetween.

As best shown in FIG. 1, the rearward or aft sling 100 is carried between the upper support beams 7 and is raised or lowered by means of hoist mechanisms 101 and 114. On one side of the hoist, a hoist cable 102 is fixed at one end 103 to one of the upper support beams 7 and passes through the vertically movable pulley system 40 and about sheaves 104, 105 and 106, carried by the upper support beam 7. The cable 102 extends along the upper support beam 7 and about another sheave 107 carried near the opposite end of the upper support beam whereat it is turned to pass along the cross beam support 6, about two sheaves 108 and 109 carried by the opposed support beam 7, and down to the hoisting mechanism 101. In this manner, operation of the hoisting mechanism 101 will raise or lower one side or end of the rearward or aft hoisting sling 100.

At the open end of the other upper support beam 7, the opposed side or end of the aft or rearward sling 100 is supported in the same manner. A hoist cable 110 is fixed at one end to the upper support beam 7 and passed through the vertically movable pulley system 40 and about sheaves carried on the upper support beam, three of which (111, 112 and 113) are shown. The cable 110 then extends downwardly toward and is connected to a hoisting mechanism 114, the operation of which is effective to raise or lower the associated end of the rearward or aft sling 100.

On each side of the hoist the mid and forward slings 200 and 300, respectively, are supported by a common hoist cable 250 or 250a. Hoist cable 250 has one of its ends connected to a hoisting mechanism 201 and the other end to a hoisting mechanism 202 to raise and lower one side or end of the inter-connected mid and fore slings 200 and 300, respectively. Both slings 200 and 300 are supported from the cable 250 in the same manner as the rearward or aft sling 100, with the cable 250 passing through a vertically movable pulley system 40. The vertically movable pulley system 40 supporting one side or end of each of the mid and fore slings 200 and 300 is supported from a traveler pulley system 280 to be discussed in more detail hereinafter. The traveler pulley system 280 is laterally movable between the aft and fore slings 100 and 300, parallel to the upper support beam 7, to vary the lateral spacing of the mid sling 200 relative to the aft and fore slings. The cable 250, which commonly supports one end of both the mid and fore slings 200 and 300, respectively, extends from the hoisting mechanism 201 about sheaves 203 and 204, supported on the upper support beam 7, along the cross beam support 6, and about sheaves 205 and 206 carried by the opposite upper support beam 7. The common cable 250 then passes through the traveler pulley system 280, through an equalizer pulley system 400 (to be discussed in detail hereinafter) and through the cross beam support 6 to the forward end of the upper support beam 7. The hoist cable 250 then passes through the vertically movable pulley system 40 supporting one end or side of the forward or fore-sling 300, and about sheaves, three of which (207,208 and 209) are shown, carried on the forward end of the upper support beam 7, and then extends across the cross beam support 6, about sheave 210 supported on the forward end of the opposite upper support beam 7, and downward to the hoisting mechanism 202. In this manner operation of the hoist mechanisms 201 and 202 will raise or lower one end of the mid and fore slings 200 and 300, respectively.

The other side or end of the mid and fore slings 200 and 300, respectively, is similarly supported from vertically movable pulley systems 40 suspended from a common hoist cable 250a. The mid sling 200 is carried by a traveler pulley system 280 in the same manner as previously described, with the ends of cable 250a being coupled to the drums of hoisting mechanisms 211 and 212. Operation of these hoisting mechanisms will raise or lower the ends of mid and fore slings 200 and 300, supported therefrom, in the same manner as previously disclosed with reference to the end or sides of the slings which are supported from hoist cable 250. With the hoist cables 250 and 250a commonly connecting adjacent ends or sides of the mid and fore slings 200 and 300, in the manner described, any loading on these two slings will be equalized between slings.

As previously disclosed, each of the vertically movable pulley systems 40 connecting opposite ends or sides of the mid sling 200 is supported from a movable traveler pulley system 280. A traveler pulley system 280 is supported from each of the upper support beams 7 to move the mid sling 200 laterally relative to the aft and fore slings 100 and 300, respectively. The traveler pulley systems include three sheaves 281 each rotatably supported on a support bar 282 which is, in turn, supported adjacent the upper support beam 7 for movement parallel to the longitudinal axis of the hoist by means of a sliding block assembly 285.

Figure 8:
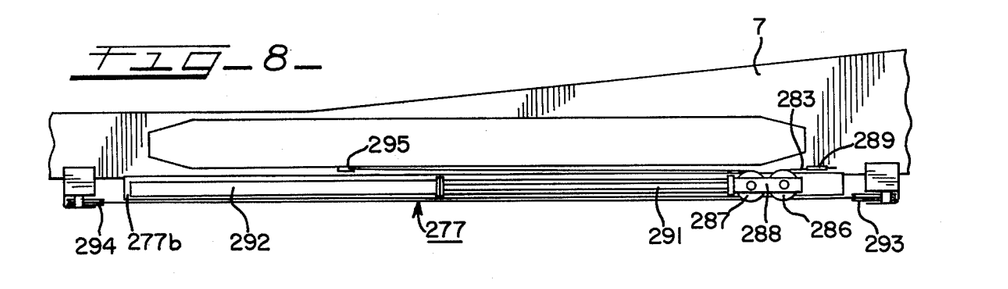
FIGS. 8 and 9 are enlarged views of the sling traveler system to better illustrate the components thereof.
Figure 9:
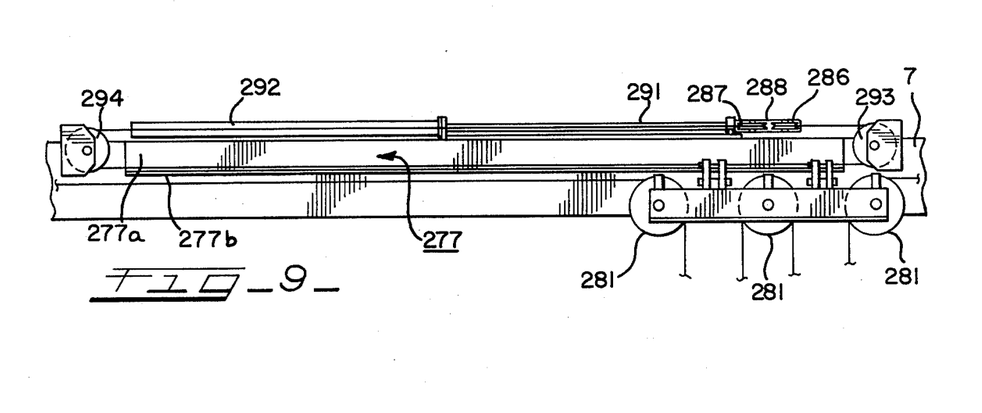

The sliding block assembly comprises, generally, an inverted T-shaped support beam 277, a traveler cable 283, a sliding block or yoke 284 and a double-acting hydraulic cylinder. The support beam 277 is secured to each upper support beam 7 with the stem portion 277a of the inverted T supported parallel to the longitudinal axis of the upper support beam, and the base portion 277b of the inverted T parallel to the surface supporting the hoist. The sliding block 284 comprises a pair of yoke-shaped supports connected to the traveler support bar 282 for supporting the traveler pulley system 280 and slidably supported from the base portion 277b of the inverted T-shaped support beam 277. The traveler cable 283 is secured to the sliding block 284 for moving the sliding block along the support beam 277 to thereby vary the lateral spacing between the mid sling 200 and the fore and aft slings, 300 and 100, respectively.

In order to effect movement of the traveler pulley system 280, a traveler cable 283 is secured to the sliding bock 284 and passes about sheaves 286 and 287 which are rotatably supported in a bracket 288 carried on the end of a piston rod 291 of the double-acting hydraulic cylinder. The cylinder portion 292 of the double-acting hydraulic cylinder is secured to the upper support beam 7. The traveler cable 283 is secured at one end 289 to the upper support beam 7 and passes about the sheave 286 supported outermost on the end of the piston rod 291 and then about a sheave 293 secured to the upper support beam 7. The traveler cable then extends parallel to the upper support beam 7 and about another sheave 294, rotatably supported from the upper support beam 7, back along the upper support beam and about the second sheave 287 supported in the piston rod bracket 288, parallel to the upper support beam 7 to which the other end 295 of the traveler cable is secured. In this manner when the piston rod 291 is extended or retracted from the hydraulic cylinder 292, the sliding block 284 secured to the traveler cable 283 will move parallel to the upper support beam 7 to vary the lateral spacing between the mid sling 200 and the other two slings.

Figure 7:
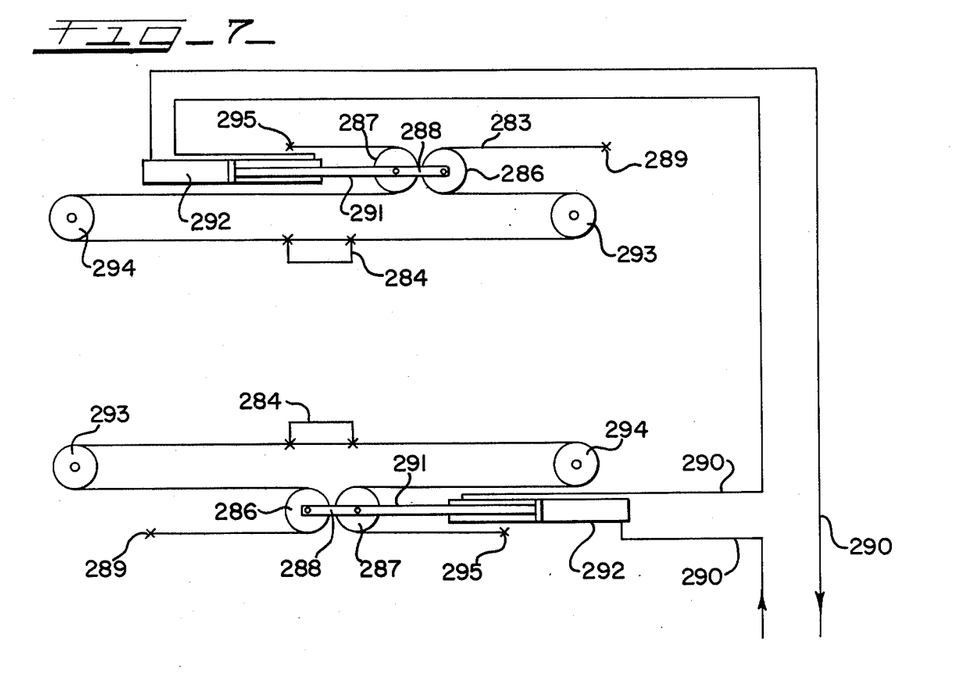
FIG. 7 is a mechanical-hydraulic schematic of a sling traveler system for varying the lateral spacing between slings.

As best shown in the hydraulic schematic of FIG. 7, when the hydraulic pressure to one of the hydraulic cylinders 292 is increased through hydraulic lines 290 extending the piston rod 291, the movement of the piston rod will effect movement of the other piston rod 291 of the other hydraulic cylinder 292 carried by the opposite upper support beam 7 to insure that both ends or sides of the mid sling 200 move the same amount and in the same direction.

Figures 2, 3, 4, 5:
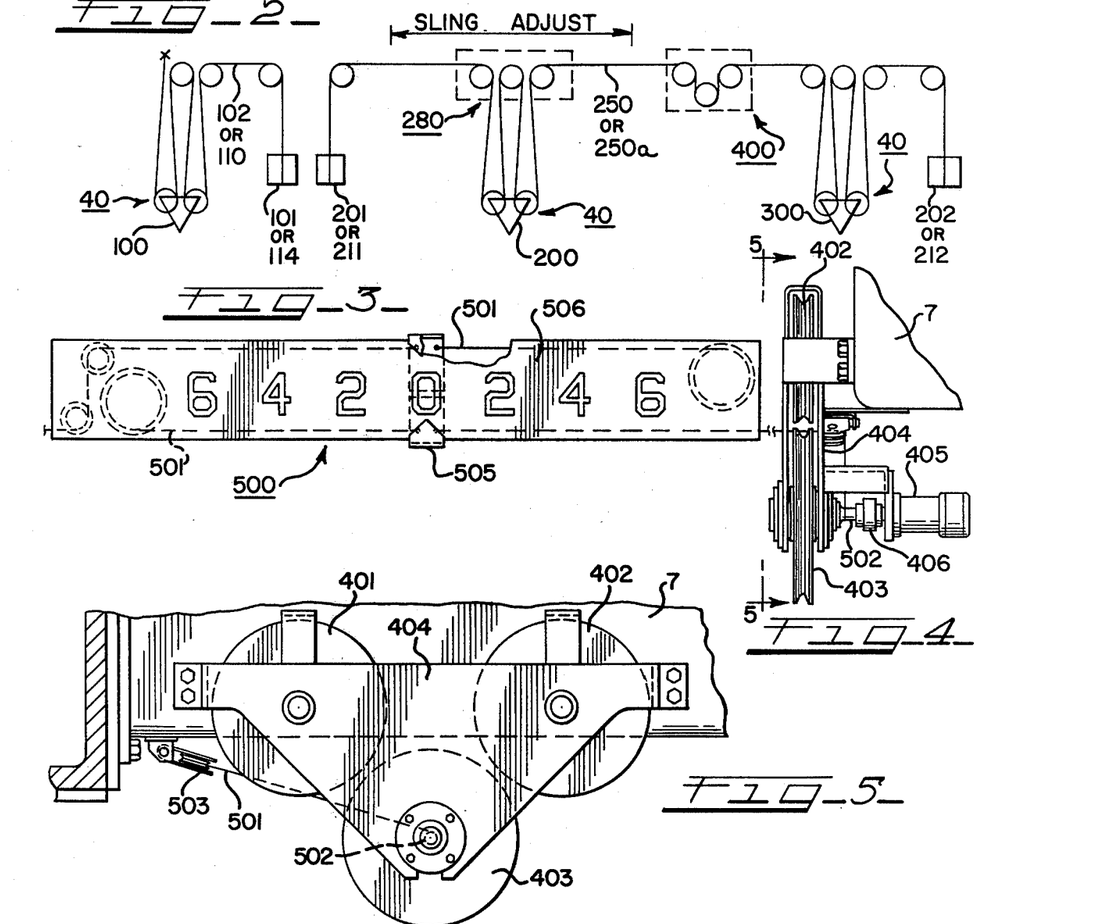
FIG. 2 is a mechanical schematic of the sling-rigging illustrated in FIG. 1 to show the manner in which the loading slings are interconnected for equalized loading and to illustrate a mechanism for maintaining equalized movement between the slings in an unloaded condition.
FIG. 3 is an enlarged detail of a portion of the apparatus illustrated in FIG. 1 to better illustrate the manner in which the loading sling adjustment may be monitored by a machine operator.
FIG. 4 is an enlarged detailed view of the mechanism for maintaining equalized movement between the loading slings in an unloaded condition.
FIG. 5 is a side view of the enlarged portion of the mechanism illustrated in FIG. 4 for maintaining equalized movement between the slings in an unloaded condition taken along lines 5—5.
Figure 6:
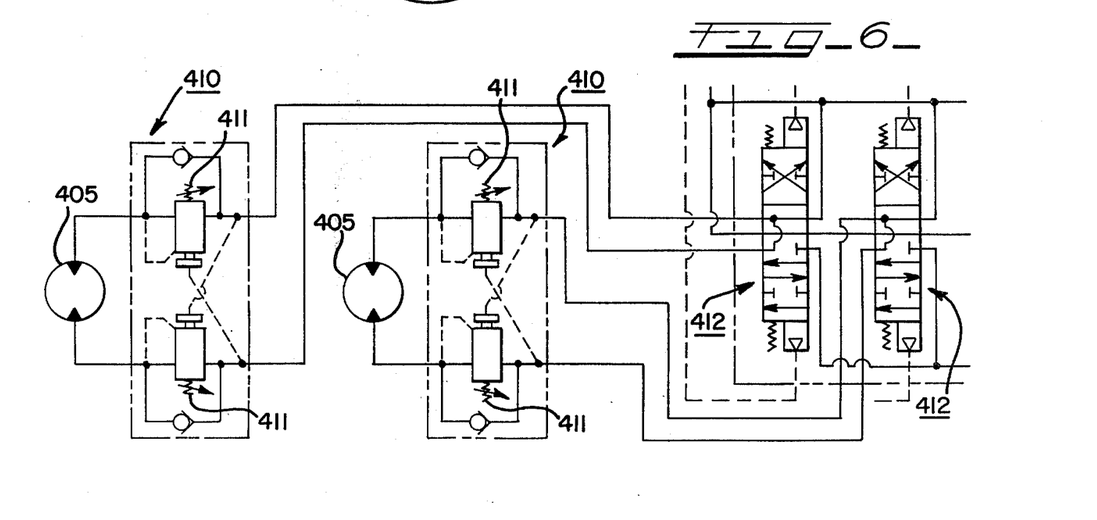
FIG. 6 is a hydraulic schematic to better illustrate the functions of the equalizing system.

As previously discussed, in order to insure equal movement of the mid and fore slings when in an unloaded condition, a pulley system 400 (shown schematically in FIG. 2) is provided for each of the hoist cables 250 and 250a. The pulley system 400 creates a load or force on the hoisting cables when the mid and fore slings are in an unloaded condition so that the inter-connected slings, 200 and 300, respectively, may be simultaneously raised or lowered. A pulley system 400, best shown in FIGS. 4 and 5, is supported from each one of the upper support beams to provide a force on the hoist cables 250 and 250a to insure such movement. Due to variations in the frictional forces of the sheave or pulley systems, the unequal weight of the slings themselves when the inter-connected slings 200 and 300 are in an unloaded condition, it is very difficult for the hoisting mechanisms 201, 202 and 211, 212 to move the slings 200 and 300 equal vertical distances. In some instances these factors can actually result in the raising of one sling while the other sling is lowered. The pulley system 400 includes two lead sheaves 401 and 402, and one friction sheave 403, all of which are rotatably supported in a frame 404 carried by the upper support beam 7 with either the hoist cable 250 and 250a passing about the three sheaves in the manner previously indicated. In order to provide an equalizing force, the lowermost or friction sheave 403 is coupled to a hydraulic motor 405 by an appropriate coupling 406 with the hydraulic circuitry for the two hydraulic equalizer motors 405 being shown in the hydraulic schematic of FIG. 6. A dual motion control valve 410, which normally operates as a counter-balance or over-center valve, is in fluid communication with each hydraulic equalizer motor 405. The control valve 410 functions to provide resistance to flow in the hydraulic motor circuit when an open-center control valve 412 is in a neutral position. The amount of this resistance to flow can be varied by adjusting a relief valve 411 in the motion control valve 410. The relief valves 411 are adjusted to provide a resistance sufficient to create enough drag force on the hoist cables to enable the vertical movement of slings 200 and 300 to be individually controlled when operated in an unloaded condition. However, when the slings are subjected to a load, the drag force is negligible in comparison to the load force so that loading is equalized between slings.

In operation, when the inter-connected slings 200 and 300 are loaded, such as when lifting or carrying a boat, the slings will accommodate the boat shape and overcome any force exerted on friction sheave 403 by the hydraulic motor 405 which, in comparison to the load force, is quite negligible. However, when the inter-connected slings are in the unloaded condition, there is sufficient friction between the hoist cables and the friction sheave 403 to prevent the hoist cables from slipping on the sheave. Any sling weight or pulley system frictional force differential between the two inter-connected slings will be equalized between the mid and fore slings 200 and 300, respectively, by the equalizer pulley system 400.

During loading, when the inter-connected slings move vertically relative to each other to conform to the contour of a boat hull, an indicator system 500 is actuated so that the slings may be returned to their equally spaced position. An indicator cable 501 is connected at one end to a wire rope drum 502 carried between each friction sheave 403 and its hydraulic motor 405 and extends therefrom about a pulley 503 supported from each upper support beam 7. The indicator cable 501 then extends adjacent the upper support beam 7 and the cross beam support 6 to form a connection with an indicator pointer 505 supported for sliding movement across an indicator plate 506 which is secured to the cross beam support 6. The indicator pointer 505 is positioned at a zero marker on the indicator plate 506 when the two equalizer slings 200 and 300 are in an equal vertical position and hoists 211, 201, 202 and 212 have an equal amount of cable on their drums. In this manner any variation in the movement of the hoisting cable over friction sheave 403 when conforming to the contour of a boat hull will move the indicator pointer 505 across the indicator plate 506 to show the position of the equalized slings relative to the center position when the slings are at the same elevation. The hydraulic circuitry shown in FIG. 6 controls actuation of the equalizing sheave motors 405 and is arranged such that the equalizing sheave 403 may be rotated to return the indicator pointer 505 to its mid position when there is no load on the equalized slings.

Referring now to the embodiment of the hoist shown in FIGS. 10-13, there is shown a sling-rigged hoist having three slings 10, 20, and 30 each comprising a pair of belts 2 connected at each end to a bar 3 supported from a movable pulley system 4 which is operatively connected to a hoisting mechanism including a winch and motor to raise or lower the slings. The slings 10, 20 and 30, belts 2, tie bar 3 and vertically movable pulley system 4 correspond to the same parts designated by reference numerals 100, 200, 300, 20, 30 and 40 in the embodiments of FIGS. 1-9. Other parts that are the same are designated by the same reference numerals. The hoist includes a structural framework supported by wheels 5 to movably support the frame on land, and is substantially symmetrical about its longitudinal axis.

Figure 10:
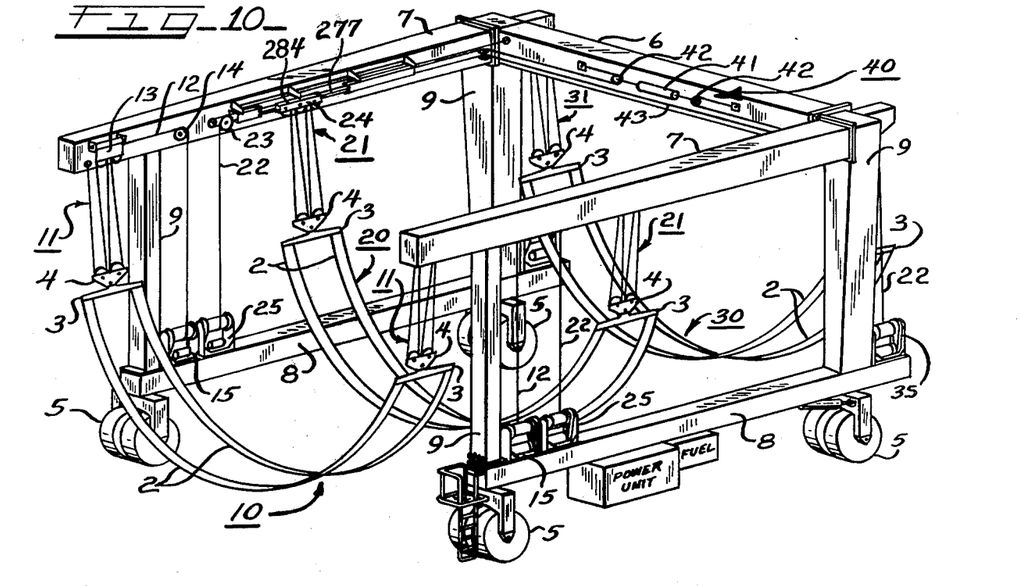
FIG. 10 is a frontal perspective view of a sling-rigged straddle-type mobile hoist illustrating another embodiment of the invention.

For convenience of illustration only one side of the hoist is shown and described in detail. However, both sides are substantially the same. The rearward end of the hoist is entirely open and the forward end is joined by a cross beam support 6 connecting upper support beams 7. The upper support beams 7 are each carried by a lower support beam 8 by support columns 9. Each of the slings 10, 20 and 30 is supported between the spaced, parallel, upper support beams 7 and extend therebetween.

As best shown in FIG. 10, the rearward or aft sling 10 is carried between upper support beams 7 and is raised and lowered by means of a pulley and cable system 11. A cable 12 at each end of the sling 10 is fixed at one end to one of the upper support beams 7 and passes through both pulleys 4 connected to the sling 10, a pulley system 13 and 14 fixed to the upper support beam, and is secured at its opposite end to a hoist mechanism 15. The sling 10 and its cable and pulley construction are carried by these upper support beams 7 in a fixed position to be raised or lowered in response to the hoist mechanism 15.

Sling 20 is carried by the upper support beams 7 and raised or lowered by means of a pulley and cable system 21. The cable 22 which effects raising or lowering of the sling is connected at one end to a hoist mechanism 25 and passes about a stationary pulley 23 and a movable or traveler pulley system 24 carried by each upper support beam 7. The cable passes through the pulleys 4 connected to sling 20 returning through traveler pulley system 24 and passing about another stationary pulley 33, through pulleys 4 connected to sling 30, and about a pair of fixed pulleys 34 supported from beam 7 to be connected at its other end to a hoist mechanism 35. The traveler pulley system 24 is a traveler pulley system which is carried by the upper support beam 7 to effect lateral movement of sling 20 relative to both slings 10 and 30.

A positioning mechanism 40 carried by the cross beam 6 is operatively connected to each of the traveler pulley systems 24 carried by the upper support beams 7 to effect lateral movement of the traveler 24 relative to the other two slings 10 and 30. The cylinder barrel of a double end hydraulic actuator 41 is fixed to cross beam 6, with the laterally movable, piston-connected cylinder rod carrying a pair of pulleys 42 for lateral movement. A cable 43, fixed at both ends of the cross brace 6, passes about the pulleys 42 and both travelers 24 such that lateral movement of the cylinder rod of the hydraulic actuator 41 will effect lateral movement of the travelers 24. The travelers 24 may be constructed and supported in the manner of the sliding block assembly 285 previously discussed.

The sling 30 at the forward end of the hoist is carried by the upper support beams 7 and extends therebetween. Cable 22, as previously described, is a continuous cable interconnected between the two hoisting mechanisms 25 and 35 to support both the laterally movable sling 20 and the fixed sling 30.

Figure 11:
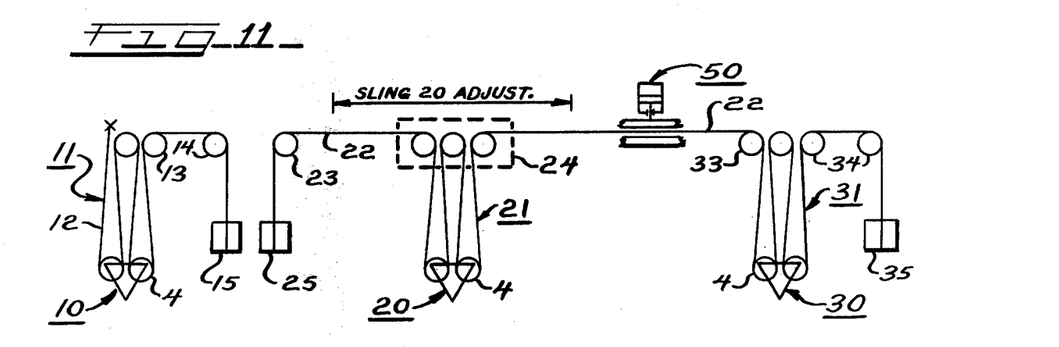
FIG. 11 is a mechanical schematic of the sling-rigging illustrated in FIG. 10 to better show the manner in which the slings are interconnected for equalized loading and to illustrate a mechanism for maintaining equalized movement between the slings in an unloaded condition.

As shown in the mechanical schematic of FIG. 11, the continuous cable 22 extends from hoisting mechanism 25 through the lift pulley system 21 coupled to sling 20, through the lift pulley stream 31 connected to a sling 30 and is connected at its other end to hoist mechanism 35. In this manner the load applied on both slings 20 and 30 will be equal. The interconnection of slings 20 and 30 by a common lifting cable 22 results in the lifting forces exerted by any combination of hoisting mechanism 25 or 35 to be equally applied in lifting both slings.

Another feature of this embodiment of the invention is to equalize sling movement when the slings are unloaded or not supporting a boat for the purposes discussed heretofore. With the slings 20 and 30 being interconnected by a common hoist cable 22 in the manner heretofore described, when the slings are lowered in an unloaded condition it could be possible for one sling to lower while the other sling remains in a fixed position, or may even rise, due to differences in the frictional forces in the system. Such variation in the frictional forces associated with the pulleys of each individual sling, along with unequal weight of the slings, requires provision for equalizing these forces when the slings are in an unloaded condition.

In FIG. 11 there is shown a cable clamping device 50 having either fixed or variable frictional characteristics. The cable clamping device clamps the common cable 22 providing sufficient friction on the cable to compensate for weight differences in the two slings or variation in the frictional characteristics of the pulleys associated with each individual sling. The friction provided by the cable clamping device 50 is overridden or may be removed when a load is carried within the slings during hoisting or lowering operation and, therefore, adds an insignificant additional load to the system in comparison with the loads being lifted or carried.

Figure 12:
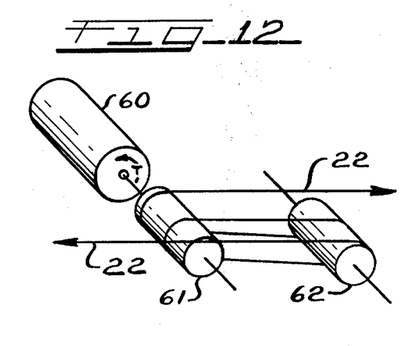
FIG. 12 is a mechanical schematic of an alternative mechanism to effect predetermined proportional loading between slings in a loaded condition.

FIG. 12 illustrates a mechanical schematic of a torqued cable drive using a variable and controllable torque motor 60 driving a drive drum 61 positioned in cooperation with an idler drum 62. The torque motor 60 applies a torque to the driving drum 61, either clockwise or counter-clockwise, dependent upon the direction in which the loading force is to be applied. As shown in FIG. 12, a counter-clockwise torque is applied to the drive drum 61 so that a greater load will be applied on the cable leading to the right than the cable leading to the left. The magnitude of this force is determined by the torque divided by the radius of the drive drum 61. Therefore, regulation of the torque motor 60 can be utilized to vary the sling loads in any amount desired.

In operation the drums 61 and 62, about which the cable 22 passes, are positioned intermediate the two slings 20 and 30 to allow the cable 22 to pass thereabout. The torque motor 60 is allowed to freely rotate without any applied torque and the slings raised into contact with, for example, a boat hull. After contact has been established, by applying a predetermined torque to the driving drum 61, through the torque motor 60, a loading differential between slings 20 and 30 will be effected during the hoisting operation.

Figure 13:
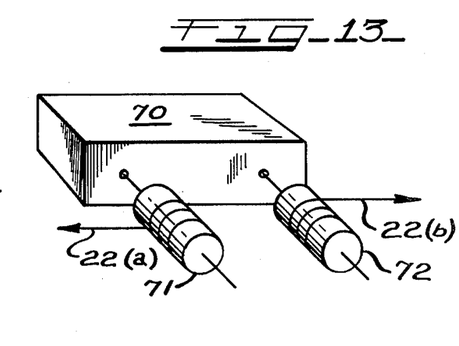
FIG. 13 is a mechanical schematic of an alternative mechanism to effect predetermined proportional loading between slings in a loaded condition.

Referring now to FIG. 13, there is shown a variable torque drive mechanism 70. The variable torque drive 70 includes a gear or belt arrangement (not shown) to provide a variable output ratio between a pair of drive drums 71 and 72 which are connected to the output shafts of the torque drive 70. In such an embodiment, a variable torque drive 70 sets the ratio of the pulley force applied to the slings, and the cable 22 comprises two separate cables 22(a) and 22(b) each connected separately and exclusively to a drive drum 71 or 72 and one of the slings 20 and 30 as in the manner of sling 10. Adjustment of the output ratio of the variable torque drive 70 provides differential or equalized loading between slings, as desired.

In operation, when the loading slings are being hoisted into contact with a load, the variable reduction torque drive mechanism 70 is locked out so that neither drum 71 or 72 revolves. After the loading slings have been hoisted into contact, the torque reduction mechanism 70 is activated to permit application of loading forces on the load in response to rhe ratio determined by the variable torque drive mechanism.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A mobile hoist for lifting and carrying loads comprising
   a frame freely movable upon a supporting surface and having spaced parallel support members carried above the supporting surface;
   a pluraliy of vertically movable load supporting slings carried by said support members with each one of said plurality extending therebetween,
   one of said plurality of load supporting slings being laterally movable upon said support members relative to another of said plurality of load supporting slings for effecting varying weight distribution of a load being supported thereby,
   said one of said plurality of vertically movable load suporting sling which is laterally movable upon said support member relative to another of said plurality of vertically movable load supporting slings being operatively connected to one of said other plurality of load supporting slings by a common cable means for effecting vertical movement of both of said load supporting slings and equalizing the force applied between said load supporting slings when engaging a load to be lifted and carried by said hoist,
   another one of said plurality of vertically movable load supporting slings being operatively connected to a second cable means for effecting vertical movement thereof independent of the vertical movement of said load supporting means coupled together by said common cable, and
   traveler means operatively positioned between said plurality of load supporting slings for moving said one of said plurality of load supporting slings laterally relative to another of said plurality of load supporting means.

2. The apparatus of claim 1 wherein said traveler means includes at least two movable support bars each carrying one end of said one of said plurality of load supporting slings and supported by each of said spaced parallel support members for lateral movement relative to another of said plurality of load supporting means, and actuator means coupled to each of said support bars to effect movement thereof.

3. A mobile hoist for lifting and carrying loads comprising
   a frame including at least two spaced parallel support members carried above and freely movable upon a supporting surface,
   a plurality of load supporting slings extending between and operatively coupled to said spaced parallel support members for engaging a load to be lifted and carried by said hoist,
   at least two hoist cable means each mutually exclusively supported from one of said support members and operatively interconnecting the adjacent ends of said plurality of load supporting slings for effecting vertical movement of said load supporting slings and equalizing the force applied between said load supporting slings when engaging a load to be lifted and carried by said hoist and
   force applying means for applying an equalizing force to said hoist cable means to effect equal vertical movement of each one of said plurality of load supporting slings when a loading force is not imposed thereon.

4. A mobile hoist for lifting and carrying loads comprising
   a frame including at least two spaced parallel support members carried above and freely movable upon a supporting surface,
   a plurality of load supporting slings extending between and operatively coupled to said spaced parallel support members for engaging a load to be lifted and carried by said hoist,
   at least two hoist cable means each mutually exclusively supported from one of said support members and operatively interconnecting the adjacent ends of said plurality of load supporting slings for effecting vertical movement of said load supporting slings and equalizing the force applied between said load supporting slings when engaging a load to be lifted and carried by said hoist, and
   said cable means includes a multiple output variable torque drive with each output thereof coupled to a cable connected to one of each of said vertically movable load supporting slings for effecting variable loading of each of said loading supporting slings in response to the output of said variable torque drives.

5. The apparatus of claim 1, wherein, one of said plurality of vertically movable load supporting slings is laterally movable upon said spaced parallel support members relative to another of said plurality of vertically movable load supporting slings for effecting varying weight distribution of a load being hoisted thereby.

6. The apparatus of claim 4, wherein each one of said plurality of vertically movable load supporting slings include a plurality of parallel spaced flexible members with each adjacent end thereof joined by a pulley system.

7. The apparatus of claim 6 wherein
   said cable means include a flexible hoist cable extending through the pulleys of each of said plurality of vertically movable load supporting slings at the ends thereof from which said slings are carried by said parallel support members,
   said flexible cable being supported from each of said spaced parallel support members with said pulleys carried therebetween, and
   the ends of said flexible cable being connected to hoisting means for effecting vertical movement of said load supporting slings.

8. The apparatus of claim 7 wherein said force applying means comprises a torque motor, drive drum and idler drum carried in operative contact with a said flexible hoist cable with said cable passing about said drive and idler drums to receive a yieldable force applied to said flexible hoist cable.

9. The apparatus of claim 3 wherein said equalizing force applying means comprises a selectively actuable clamp carried by each of said spaced parallel support members for applying a frictional force to said hoist cable means.

10. The apparatus of claim 3, wherein said equalizing force applying means includes a sheave frictionally engaging said hoist cable means to apply a frictional force thereto for equalizing vertical movement of said load supporting slings when a loading force is not imposed thereon.

11. The apparatus of claim 10 further including means for producing a torque force on said sheave to equalize the vertical position of said load supporting slings when a load is not imposed thereon.

12. A mobile hoist for lifting and carrying loads comprising
   a frame including at least two spaced parallel support members carried above and freely movable upon a supporting surface,
   a plurality of load supporting slings extending between and operatively coupled to said spaced parallel support members for engaging a load to be lifted and carried by said hoist,
   at least two hoist cable means each mutually exclusively supported from one of said support members and operatively interconnecting the adjacent ends of said plurality of load supporting slings for effecting vertical movement of said load supporting slings and equalizing the force applied between said load supporting slings when engaging a load to be lifted and carried by said hoist, and
   force applying means for applying a predetermined force to said flexible hoist cable means in addition to the loading forces applied through said plurality of vertically movable load supporting slings to vary the distribution of the loading forces applied thereby.

* * * * *

UNITED STATES PATENT AND TRADEMARK OFFICE
CERTIFICATE OF CORRECTION

PATENT NO. : 4,236,859

DATED : December 2, 1980

INVENTOR(S) : Richard A. Stearn; Gerald P. Lamer; Norbert W. Lenius

It is certified that error appears in the above—identified patent and that said Letters Patent is hereby corrected as shown below:

Column 6, line 40, delete the word "equalizer" and insert the word -- equalized --.

Column 7, line 63, delete the word "stream" and insert the word -- system --.

Column 9, line 7, delete the word "rhe" and insert the word -- the --.

Signed and Sealed this

Twenty-fourth Day of February 1981

[SEAL]

Attest:

RENE D. TEGTMEYER

Attesting Officer

Acting Commissioner of Patents and Trademarks